(12) United States Patent
Takeshita et al.

(10) Patent No.: US 7,466,037 B2
(45) Date of Patent: Dec. 16, 2008

(54) POWER SUPPLY CONTROL CIRCUIT

(75) Inventors: Junji Takeshita, Atsugi (JP); Takashi Takeda, Atsugi (JP); Kouichirou Sakamoto, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 104 days.

(21) Appl. No.: 11/454,563

(22) Filed: Jun. 16, 2006

(65) Prior Publication Data
US 2007/0081285 A1   Apr. 12, 2007

(30) Foreign Application Priority Data
Sep. 28, 2005   (JP)   ............................. 2005-282445

(51) Int. Cl.
*H02J 3/38* (2006.01)

(52) U.S. Cl. ............................. 307/52; 361/84; 323/224

(58) Field of Classification Search ................. 323/222, 323/223, 224, 244, 276, 277, 282, 283, 284, 323/285; 307/52, 85, 116; 361/84, 246
See application file for complete search history.

(56) References Cited

U.S. PATENT DOCUMENTS

| 3,601,659 | A | * | 8/1971 | Tanaka | 361/65 |
|---|---|---|---|---|---|
| 5,075,813 | A | * | 12/1991 | Takabayashi | 361/84 |
| 5,539,610 | A | * | 7/1996 | Williams et al. | 361/246 |
| 5,994,843 | A | * | 11/1999 | Kataoka et al. | 315/106 |
| 6,414,469 | B1 | * | 7/2002 | Zhou et al. | 323/272 |
| 6,541,947 | B1 | * | 4/2003 | Dittmer et al. | 323/284 |
| 2002/0050853 | A1 | * | 5/2002 | Hosoki | 327/538 |
| 2002/0149266 | A1 | * | 10/2002 | Tahara | 307/116 |
| 2004/0052100 | A1 | * | 3/2004 | Huang et al. | 363/125 |
| 2005/0169022 | A1 | * | 8/2005 | Takeshita et al. | 363/89 |
| 2005/0286194 | A1 | * | 12/2005 | Fujiki et al. | 361/100 |
| 2006/0152203 | A1 | * | 7/2006 | Perry et al. | 323/283 |
| 2007/0273212 | A1 | * | 11/2007 | Henkel et al. | 307/66 |

FOREIGN PATENT DOCUMENTS

| JP | 11 69649 | 3/1999 |
|---|---|---|
| JP | 2001 51735 | 2/2001 |

* cited by examiner

*Primary Examiner*—Akm E Ullah
*Assistant Examiner*—M'Baye Diao
(74) *Attorney, Agent, or Firm*—Ladas & Parry LLP

(57) ABSTRACT

A power supply control circuit is disclosed. The power supply control circuit controls a current which is supplied from a power source to a load. The power supply control circuit includes a reverse current detecting circuit which detects a reverse current flowing from the load to the power source and a reverse current preventing circuit which disconnects a line between the power source and the load when the reverse current is detected by the reverse current detecting circuit.

3 Claims, 2 Drawing Sheets

US 7,466,037 B2

POWER SUPPLY CONTROL CIRCUIT

BACKGROUND OF THE INVENTION

1. Field of the Invention

The present invention relates to a power supply control circuit for controlling a current which is supplied from a power source to a load by controlling a transistor disposed between the power source and the load.

2. Description of the Related Art

Recently, many mobile electronic instruments have been used, and the mobile electronic instrument is driven by a secondary battery such as a lithium-ion battery. The secondary battery installed in the mobile electronic instrument is charged from a DC (direct current) power source by connecting to the DC power source via an AC adaptor or a USB port.

In order to control a charging current, a charging control circuit is disclosed. The charging control circuit charges a secondary battery by controlling a current which is supplied from a DC power source to the secondary battery by being connected between the DC power source and the secondary battery such as the lithium-ion battery (refer to Patent Documents 1 and 2).

FIG. 2 is a circuit diagram including a charging control circuit.

In FIG. 2, a DC voltage is applied to a charging control circuit 11 from a DC power source 12. The DC voltage is smoothened by a capacitor C1 and is applied to the source of a control transistor M1. The control transistor M1 is a p channel MOS transistor and its drain is connected to a secondary battery 13 via a current detecting resistor Rs. A starting rheostat R1 is connected between the source and the gate of the control transistor M1. A capacitor C2 is connected to the secondary battery 13 in parallel and smoothens a voltage applied to the secondary battery 13.

The control transistor M1 controls a current which is supplied to the secondary battery 13 from the DC power source 12 by being controlled corresponding to a control signal from a control circuit 21. A voltage at both the ends of the current detecting resistor Rs is applied to the control circuit 21. The control circuit 21 controls the control transistor M1 so that a voltage applied to the secondary battery 13 becomes a constant voltage or a current applied to the secondary battery 13 becomes a constant current.

Between the drain and the back gate of the control transistor M1, a body diode D1 is formed as a plastic diode so that a current from the secondary battery 13 to the DC power source 12 becomes a forward current. Therefore, when the voltage of the secondary battery 13 becomes larger than that of the DC power source 12, a current flows reversely from the secondary battery 13 to the DC power source 12 via the body diode D1.

In order to prevent the reverse current, a diode (not shown) is disposed in series between the DC power source 12 and the secondary battery 13 so that a current from the DC power source 12 to the secondary battery 13 becomes a forward current (refer to Patent Document 1). Further, in order to prevent the reverse current, a voltage applied to the back gate of the control transistor M1 is controlled (refer to Patent Document 2).

[Patent Document 1] Japanese Laid-Open Patent Application No. 11-69649

[Patent Document 2] Japanese Laid-Open Patent Application No. 2001-51735

However, when the diode is disposed in series between the DC power source 12 and the secondary battery 13, a voltage drop caused by the forward current in the diode occurs. Consequently, the charging efficiency is decreased.

SUMMARY OF THE INVENTION

The present invention provides a power supply control circuit which prevents a reverse current from a load to a power source.

According to one aspect of the present invention, there is provided a power supply control circuit for controlling a current which is supplied from a power source to a load. The power supply control circuit includes a reverse current detecting circuit which detects a reverse current flowing from the load to the power source and a reverse current preventing circuit which disconnects a line between the power source and the load when the reverse current is detected by the reverse current detecting circuit.

According to another aspect of the present invention, the reverse current detecting circuit detects the reverse current based on a difference between a voltage of the power source and a voltage of the load, and detects the reverse current when the voltage of the load is smaller than the voltage of the power source.

According to another aspect of the present invention, the reverse current detecting circuit includes a subtraction circuit which outputs the difference between the voltage of the power source and the voltage of the load, and a comparison circuit which compares the output from the subtraction circuit and a reference voltage and outputs a comparison result.

According to another aspect of the present invention, the reverse current preventing circuit is disposed between the power source and the control transistor and includes a reverse current preventing transistor in which a body diode is formed, and the reverse direction of the body diode is a direction from the control transistor side to the power source side.

According to another aspect of the present invention, the reverse current preventing circuit includes a driving circuit which drives the reverse current preventing transistor by using an output from the reverse current detecting circuit, and a power source is supplied to the driving circuit from a connection point of the reverse current preventing transistor and the control transistor.

According to another aspect of the present invention, the power supply control circuit further includes a control transistor disposed between the power source and the load, and the current which is supplied from the power source to the load is controlled by controlling the control transistor.

According to an embodiment of the present invention, a reverse current flowing from a load to a power source is detected and a line between the power source and the load is disconnected when the reverse current is detected. Therefore, the reverse current which flows from the load to the power source can be prevented.

Other advantages and further features of the present invention will become apparent from the following detailed description when read in connection point with the accompanying drawings.

DETAILED DESCRIPTION OF THE PREFERRED EMBODIMENT

Figure 1:
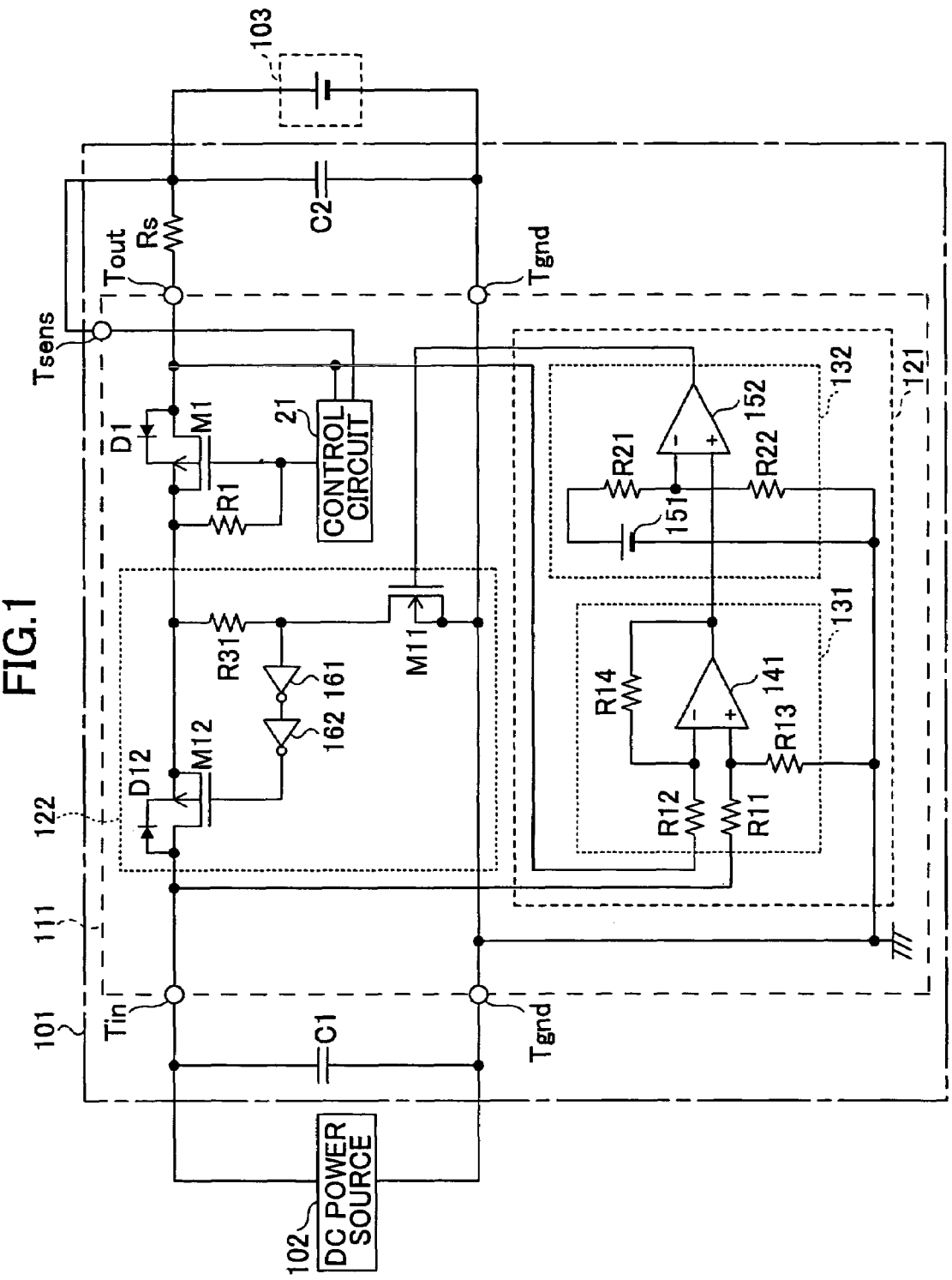
FIG. 1 is a circuit diagram including a power supply control circuit according to an embodiment of the present invention.

Referring now to the drawings, an embodiment of the present invention is described.

Figure 2:
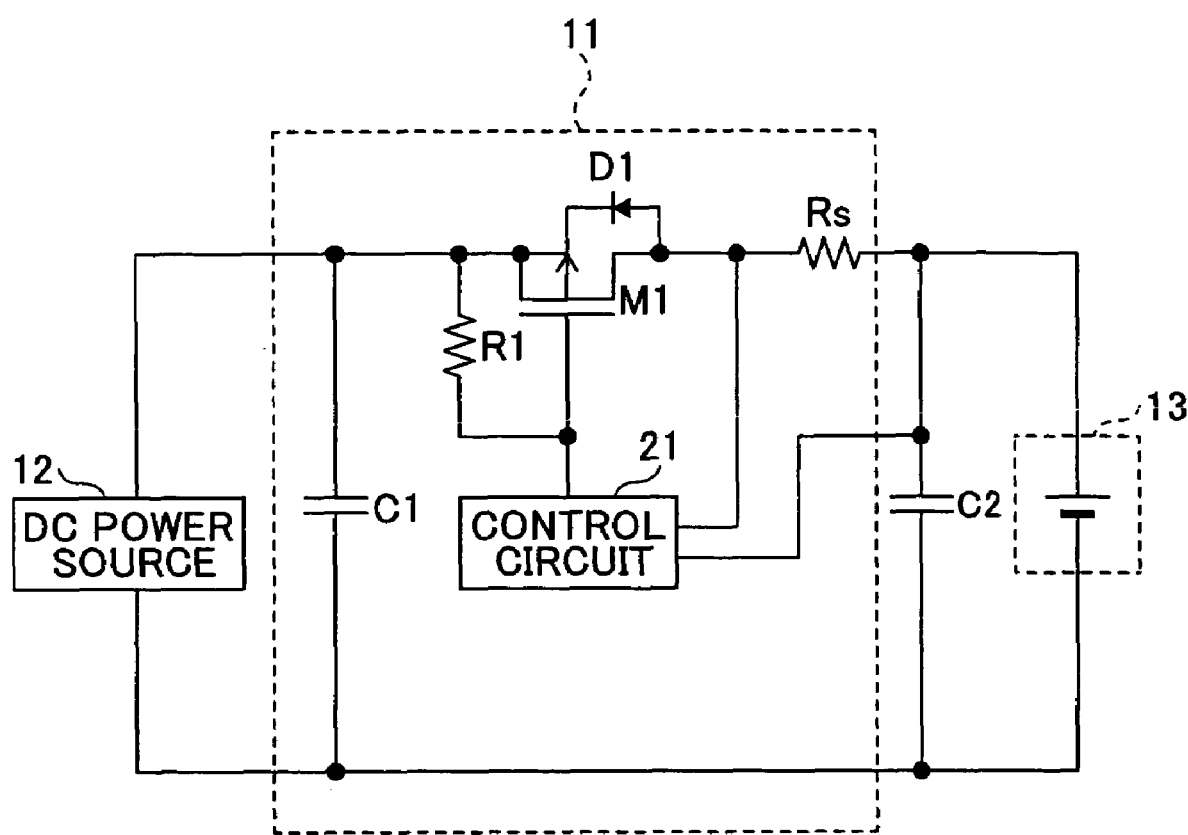
FIG. 2 is a circuit diagram including a charging control circuit.

FIG. 1 is a circuit diagram including a power supply control circuit according to the embodiment of the present invention. In the embodiment of the present invention, the detailed description of the same elements described in FIG. 2 is omitted.

[Structure]

As shown in FIG. 1, a power supply control circuit 101 includes a power control IC 111, a current detecting resistor Rs, and capacitors C1 and C2. The power supply control circuit 101 is disposed between a DC power source 102 and a load 103.

In the power supply control circuit 101, the power control IC 111 includes a reverse current detecting circuit 121 and a reverse current preventing circuit 122. That is, the power supply control circuit 101 newly provides the reverse current detecting circuit 121 and the reverse current preventing circuit 122.

[Reverse Current Detecting Circuit 121]

The reverse current detecting circuit 121 includes a subtraction circuit 131 and a comparison circuit 132.

The subtraction circuit 131 includes resistors R11 through R14 and a differential amplifier 141, and outputs a signal in which a voltage at the terminal Tout is subtracted from a voltage at the terminal Tin. The signal output from the subtraction circuit 131 becomes positive when the voltage at the terminal Tin is larger than that at the terminal Tout, that is, in a state that a current flows from the DC power source 102 to the load 103. On the other hand, the signal output from the subtraction circuit 131 becomes negative when the voltage at the terminal Tin is smaller than that at the terminal Tout, that is, in a state that a current flows from the load 103 to the DC power source 102. The signal output from the subtraction circuit 131 is supplied to the comparison circuit 132.

The comparison circuit 132 includes a reference voltage source 151, resistors R21 and R22, and a comparator 152, and compares a reference voltage generated by the reference voltage source 151 and the resistors R21 and R22 with the output (signal) from the subtraction circuit 131. The output from the comparison circuit 132 becomes a low level when the output from the subtraction circuit 131 is smaller than the reference voltage, that is, in a reverse current flowing (detecting) state. On the other hand, the output from the comparison circuit 132 becomes a high level when the output from the subtraction circuit 131 is larger than the reference voltage, that is, in a non-reverse current flowing (detecting) state. The values of the resistors R11 through R14 and the resistors R21 and R22 are adjusted so that a reverse current can be detected even in a state that the voltage at the load 103 is relatively smaller than that at the DC power source 102. The values of the resistors R11 through R14 and the resistors R21 and R22 are adjusted by using, for example, a laser trimming method.

[Reverse Current Preventing Circuit 122]

The reverse current preventing circuit 122 includes transistors M11 and M12, a resistor R31, and inverters 161 and 162.

The transistor M11 is an n channel MOS transistor and the output from the comparison circuit 132 of the reverse current detecting circuit 121 is supplied to its gate. The source of the transistor M11 is connected to the ground terminal Tgnd, and the drain of the transistor M11 is connected to the source of the control transistor M1 via the resistor R31. One end of the resistor R31 is connected to a connection point of the source of the transistor. M12 and the source of the control transistor M1, and the other end of the resistor R31 is connected to a connection point of the drain of the transistor M11 and the input of the inverter 161.

The connection point of the drain of the transistor M11 and the resistor R31 is connected to the gate of the transistor M12 via the inverters 161 and 162. The drain of the transistor M12 is connected to the terminal Tin, and its source is connected to the source of the control transistor M1. In the transistor M12, a body diode D12 is formed.

The transistor M12 is driven and switched by a driving circuit composed of the transistor M11, the resistor R31, and the inverters 161 and 162. The driving circuit obtains driving power from the connection point of the source of the control transistor M1 and the source of the transistor M12. Even when the transistor M12 is turned off, the driving circuit obtains driving power from the load 103 via the body diode D1 of the control transistor M1 and can drive the transistor M12.

[Operations]

The transistor M11 is turned off when the output from the reverse current detecting circuit 121 is a low level, that is, when the reverse current is detected. When the transistor M11 is turned off, the input of the inverter 161 becomes a high level. With this, the output from the inverter 162 becomes a high level and the gate of the transistor M12 becomes a high level. Then, the transistor M12 is turned off. When the transistor M12 is turned off, the terminal Tin is disconnected from the source of the control transistor M1. At this time, in the body diode D12 of the transistor M12, the terminal Tin is in the reverse direction viewed from the source of the control transistor M1; therefore, a reverse current from the source of the control transistor M1 to the terminal Tin can be prevented.

The transistor M11 is turned on when the output from the reverse current detecting circuit 121 is a high level, that is, when the reverse current is not detected. When the transistor M11 is turned on, the input of the inverter 161 becomes a low level. With this, the output from the inverter 162 becomes a low level and the gate of the transistor M12 becomes a low level. Then, the transistor M12 is turned on. When the transistor M12 is turned on, the terminal Tin is connected to the source of the control transistor M1, and a current flows from the terminal Tin to the source of the control transistor M1. That is, the current flows from the terminal Tin to the terminal Tout via the control transistor M1.

As described above, according to the embodiment of the present invention, in a state that a voltage at the terminal Tin is larger than that at the terminal Tout and a current can be supplied to the load 103 from the DC power source 102, the transistor M12 is turned on and the current can be supplied from the DC power source 102 to the load 103 with a low loss. On the other hand, in a state that a voltage at the terminal Tin is smaller than that at the terminal Tout and a current can be supplied from the load 103 to the DC power source 102, the transistor M12 is turned off and the current cannot be supplied from the load 103 to the DC power source 102 by the body diode D12 in the transistor M12. That is, a reverse current from the load 103 to the DC power source 102 can be prevented.

According to an embodiment of the present invention, since the values of the resistors R11 through R14, and R21 and R22 can be finely adjusted by a laser trimming method, the reverse current can be prevented.

In addition, when it is defined that the voltage at the terminal Tin is Vin and the voltage at the terminal Tout is Vout, the reverse current preventing condition is not simply determined as Vin<Vout. That is, the condition is determined as (Vin+$\alpha$)

<Vout, in this case, for example, α=100 mV. Therefore, the reverse current can be prevented by the above condition.

Further, the DC power source 102 is not limited to the AC adaptor or the USB port connected to a power source line. A secondary battery such as a lithium-ion battery, a nickel-cadmium battery, and so on can be used as the DC power source 102.

In addition, as the load 103, a rechargeable battery (secondary battery) such as a lithium-ion battery, a nickel-cadmium battery, and so on can be used.

Further, the present invention is not limited to the embodiment, but variations and modifications may be made without departing from the scope of the present invention.

The present application is based on Japanese Priority Patent Application No. 2005-282445 filed on Sep. 28, 2005, with the Japanese Patent Office, the entire contents of which are hereby incorporated by reference.

What is claimed is:

1. A power supply controlling circuit, connected between a power source and a load, for controlling a current which is supplied from the power source to the load by controlling a control transistor; comprising:
    a reverse current detecting circuit which detects a reverse current flowing from the load to the power source; and
    a reverse current preventing circuit which disconnects a line between the power source and the load when the reverse current is detected by the reverse current detecting circuit; wherein
    the reverse current preventing circuit is disposed between the power source and the control transistor and includes a reverse current preventing transistor in which a body diode is formed, and the reverse direction of the body diode is a direction from the control transistor side to the power source side; and
    the reverse current preventing circuit further includes a driving circuit which receives and is driven by an output of the reverse current detecting circuit and which receives a power source from a connection point of the reverse current preventing transistor and the control transistor, wherein the power source voltage received from the connection point drives the reverse current preventing transistor.

2. The power supply control circuit as claimed in claim 1, wherein:
    the reverse current detecting circuit detects the reverse current based on a difference between a voltage of the power source and a voltage of the load, and detects the reverse current when the voltage of the load is smaller than the voltage of the power source.

3. The power supply control circuit as claimed in claim 2, wherein:
    the reverse current detecting circuit includes a subtraction circuit which outputs the difference between the voltage of the power source and the voltage of the load, and
    a comparison circuit which compares the output from the subtraction circuit and a reference voltage and outputs a comparison result.

\* \* \* \* \*